United States Patent [19]
Amuro et al.

[11] Patent Number: 6,016,506
[45] Date of Patent: *Jan. 18, 2000

[54] NON-INTRUSIVE SCSI STATUS SENSING SYSTEM

[75] Inventors: Stephen J. Amuro, Middletown; Paul J. Giorgio, Providence, both of R.I.

[73] Assignee: The United States of America as represented by the Secretary of the Navy

[ * ] Notice: This patent is subject to a terminal disclaimer.

[21] Appl. No.: 08/219,553

[22] Filed: Mar. 29, 1994

[51] Int. Cl.[7] .............................. G06F 13/38; G06F 15/17
[52] U.S. Cl. ............................................................. 709/217
[58] Field of Search .............................. 395/200, DIG. 1; 364/200; 709/217

[56] References Cited

U.S. PATENT DOCUMENTS

| | | | |
|---|---|---|---|
| 4,783,730 | 11/1988 | Fischer ..................................... | 364/200 |
| 4,864,532 | 9/1989 | Reeve et al. ............................. | 364/900 |
| 5,471,634 | 11/1995 | Giorgio et al. ..................... | 395/200.01 |

OTHER PUBLICATIONS

ANSI X3.131–1986, pp. 26, 51–71, 80–82, 185–186, 194–199, 208–209.

*Primary Examiner*—Mark H. Rinehart
*Attorney, Agent, or Firm*—Michael J. McGowan; Robert W. Gauthier; Prithvi C. Lall

[57] ABSTRACT

An improved SCSI controller provides a logical connection between a plurality of host processors using a single SCSI initiator. The controller contains removable host adapters for connection to any type of host processor interface. When a host processor requests status information of a target device, that status information is passed to the requesting processor and subsequently stored in the controller and made available to all other host processors. In addition, a fault tolerant performance monitoring algorithm, executing within the controller, is scheduled to non-intrusively and periodically check the status of each SCSI target device and to store that status information for all host processors. The advantage to such a controller is that by using a single SCSI initiator, each host processor can independently and logically connect through the controller and SCSI initiator to a target without clearing target status information for other host processors. This is particularly advantageous when adapted to function in a local area network (LAN) arrangement wherein a significant number of host processors are requesting data.

7 Claims, 5 Drawing Sheets

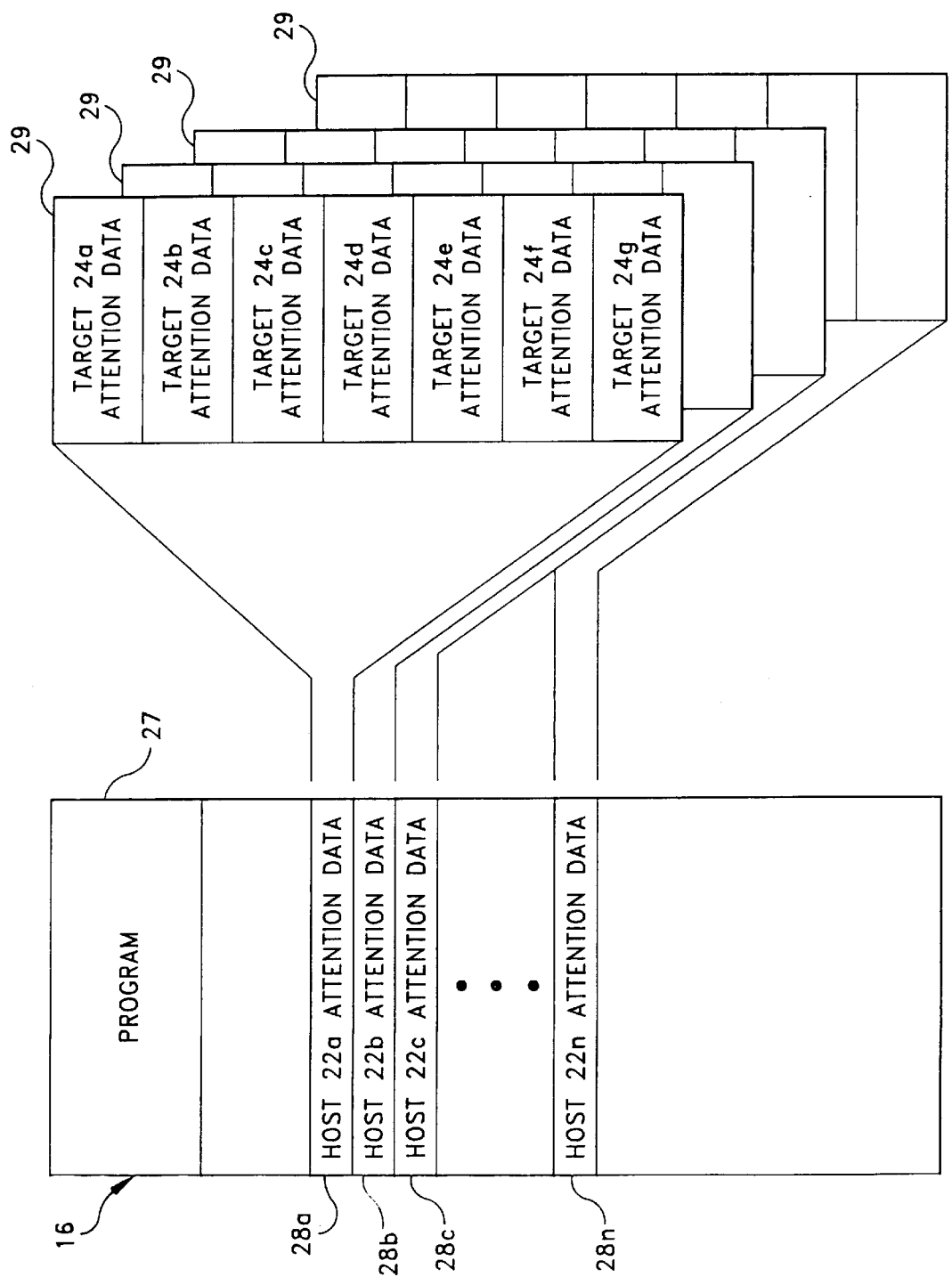

NON-INTRUSIVE SCSI STATUS SENSING SYSTEM

STATEMENT OF GOVERNMENT INTEREST

The invention described herein may be manufactured and used by or for the Government of the United States of America for governmental purposes without the payment of any royalties thereon or therefor.

CROSS-REFERENCE TO RELATED PATENT APPLICATIONS

This patent application is co-pending with five related patent applications entitled SCSI Controller with Target Status Retrieval U.S. patent application Ser. No. 08/219,552, Network File Server with Automatic Sensing Means U.S. patent application Ser. No. 08/219,556, Method of Non-Intrusively Sensing Status in a Computer Peripheral U.S. patent application Ser. No. 08/219,557, Method of Retrieving and Storing Computer Peripheral Data U.S. patent application Ser. No. 08/219,554, and Method of Sensing Target Status in a Local Area Network U.S. patent application Ser. No. 08/219,555 by the same inventors as this application.

BACKGROUND OF THE INVENTION

(1) Field of the Invention

The present invention relates to a controller for interfacing a plurality of processors through a single Small Computer System Interface (SCSI) initiator disposed within the controller to a plurality of SCSI peripheral devices. More particularly, the controller described in the present invention provides a logical connection between a plurality of processors, herein referred to as host processors, and a single SCSI initiator located within the controller. When connected to the controller, the plurality of host processors can independently communicate with a plurality of SCSI peripherals or, as defined in the American National Standards Institute (ANSI) SCSI specification, target devices through the single SCSI initiator via industry standard or user defined interfaces, protocols, and commands. Target status information is cleared from the target's memory when the initiator requests status. In the present invention this target status information is automatically sensed and stored by the controller for every host processor. The prior art system of integrating one initiator within a controller to a plurality of SCSI target devices is replaced with a new and improved system that expands the current protocol arrangement between one SCSI initiator and a plurality of SCSI targets and removes the need to add initiators as the number of host processors increases.

(2) Description of the Prior Art

Many types of peripheral devices can be interfaced to digital computers. For example, mass storage devices are used by computers to store and retrieve information. These devices utilize different types of media such as magnetic tape, magnetic disk, optical disk, or semiconductor memory. Each type of peripheral requires a unique, or device specific, interface. The American National Standards Institute has approved standard X3.131-1986, designated the Small Computer Systems Interface or SCSI-I, that allows a computer system to connect, through a device called an initiator, to a plurality of dissimilar peripheral devices, or SCSI targets, using high level device independent commands. The connection from the computer system to these targets is made through the SCSI initiator. The initiator sends commands to targets as defined in the ANSI standard, and the targets respond to these commands. ANSI standard X3.131-1986 permits one initiator to communicate with up to seven physical devices or targets in a time shared arrangement. More than one initiator can be used. However, the total number of initiators and targets cannot exceed eight. Target status conditions are reported to the requesting initiator and subsequently to the requesting processor which communicates with the initiator. In the prior art, once a target's status is reported from the target through the initiator to the processor, that status information, normally stored in the target's controller, is cleared. If another processor were to connect to the same initiator and request status information on the same target, that information would not be available. Thus, the prior art system of using one initiator for multiple processors is disadvantageous in that if one processor receives and subsequently clears all target status information, other processors connected to that initiator are unaware of any changes that may have been made in the target's status. The only system available, prior to the present invention that would retain status information and make it available to a second host processor is to add a second initiator, connect the second processor to the second initiator, and connect the second initiator to the SCSI bus. Since the total number of targets and initiators is limited, adding another initiator decreases the total number of targets that the system can handle.

SUMMARY OF THE INVENTION

Accordingly, it is a general purpose and object of the present invention to provide an improved controller for automatically and non-intrusively interrogating the status of SCSI target devices and maintaining that status. A more specific object is that an SCSI controller with embedded diagnostics performs automatic and non-intrusive interrogation of the status of SCSI target devices and maintains the status for any host processor connected to the controller. It is a further object that the controller maintains all changes in target status since the last communication with each host processor. Target status is never lost during periods of host processor inactivity. An additional object is that the present inventive system uses only one SCSI initiator.

These objects are accomplished with the present invention by providing a system operating in the following manner. A controller that is typically a personal computer (PC), workstation, or any type of embedded controller includes removable host adapters that provide an interface to a plurality of host processors. The controller, by non-intrusively interrogating the SCSI targets, allows multiple changes in the SCSI target's condition to be stored for access by any connected host processor. This feature is particularly advantageous if the host processors are idle for a long period of time resulting in multiple changes to the SCSI targets. When the controller senses a change in a target's condition and a host processor issues a READ or WRITE command to that target, the controller responds with a warning message that a change exists in that target's condition. The host processor can then issue a REQUEST STATUS command to the controller to determine the nature of the change.

BRIEF DESCRIPTION OF THE DRAWINGS

For a more complete understanding of the present invention and the advantages thereof, reference is now made to the following description of the preferred embodiment taken in conjunction with the accompanying drawings in which:

FIG. 2 is a block diagram showing the arrangement of the memory within the controller of FIG. 1;

DESCRIPTION OF THE PREFERRED EMBODIMENT

Figure 1:
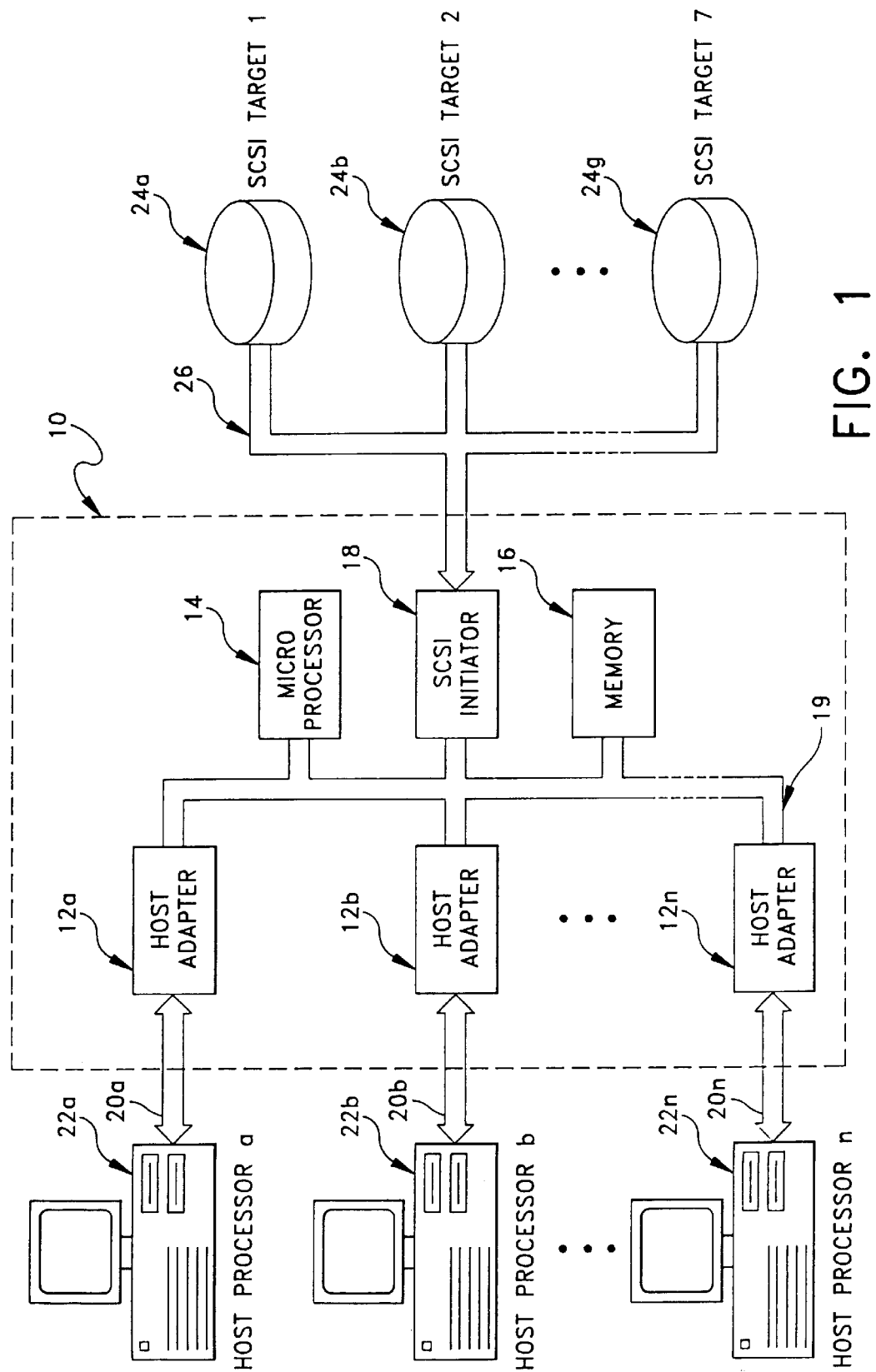
FIG. 1 is a block diagram of an SCSI controller connected to external host processors and SCSI target devices in accordance with the present invention.

Refer now to the drawing of FIG. 1 for a general description of the operation of the system and the components required to carry out its operation. A more detailed description is given later on with reference to the remaining figures. In all figures, identical components within the system carry identical numerals and letters. However, if a component in one figure is represented in other figures by various components, then different markings are used to denote each component not shown in the one figure.

FIG. 1 shows an SCSI controller 10 comprised of a plurality of host adapters 12a–n, a microprocessor 14, memory 16, and an SCSI initiator 18. All of these elements are electrically and logically connected using internal bus 19. Input/output interface means 20a–n connect respective host adapters 12a–n to respective host processors 22a–n. SCSI targets 24a–g connect to the SCSI initiator 18 of controller 10 by means of SCSI bus 26.

Host adapters 12a–n can be any integrated circuit or printed circuit card used for interfacing input/output devices to a computer. If, for example, host processor 22a is using an industry standard RS-232 serial protocol, then host adapter 12a would be a Universal Asynchronous Receiver Transmitter (UART) such as the Motorola 6850. Typically, if controller 10 includes a commercially available personal computer, then host adapter 12a would be a serial input/output printed circuit card. In another example, host processor 22b uses a parallel input/output protocol and host adapter 12b is a standard peripheral interface adapter (PIA) such as Motorola 6820. Again this could be a parallel input/output printed circuit card if controller 10 is arranged as a personal computer. If host processors 12a–n are connected to a local area network (LAN), then only one host adapter 12a is necessary and would function as a LAN controller such as an Ethernet or Fiber Distributed Data Interface (FDDI) controller. It is obvious to one of skill in the art the selection of the type and manufacturer of UART, peripheral interface adapter, or network controller that can be used. Other types of host processor interfaces and protocols can also be accommodated, provided the signal levels, protocol, and timing sequences are defined.

Microprocessor 14 is any commercially available microprocessor or microcontroller utilizing 8, 16, 32, or any other number of bits for a data path. In a typical embodiment, microprocessor 14 is a standard microprocessor used with personal computers such as the INTEL 80386 or 80486. Typically, controller 10 is a commercially available personal computer (PC) with expansion slots for accommodating external devices. The personal computer uses an industry standard operating system, such as DOS, and executes industry standard network management and file server software.

SCSI initiator 18 is an off-the-shelf commercially available integrated circuit (IC) such as the Fujitsu MB7030 or an SCSI printed circuit card. SCSI initiator cards typically are purchased with interface software so that the card, once inserted into a personal computer, can operate without the operator having to develop any unique software. This is typically the case when the personal computer is configured as a file server in a local area network (LAN) topology that services a plurality of host processors.

Figure 3A:
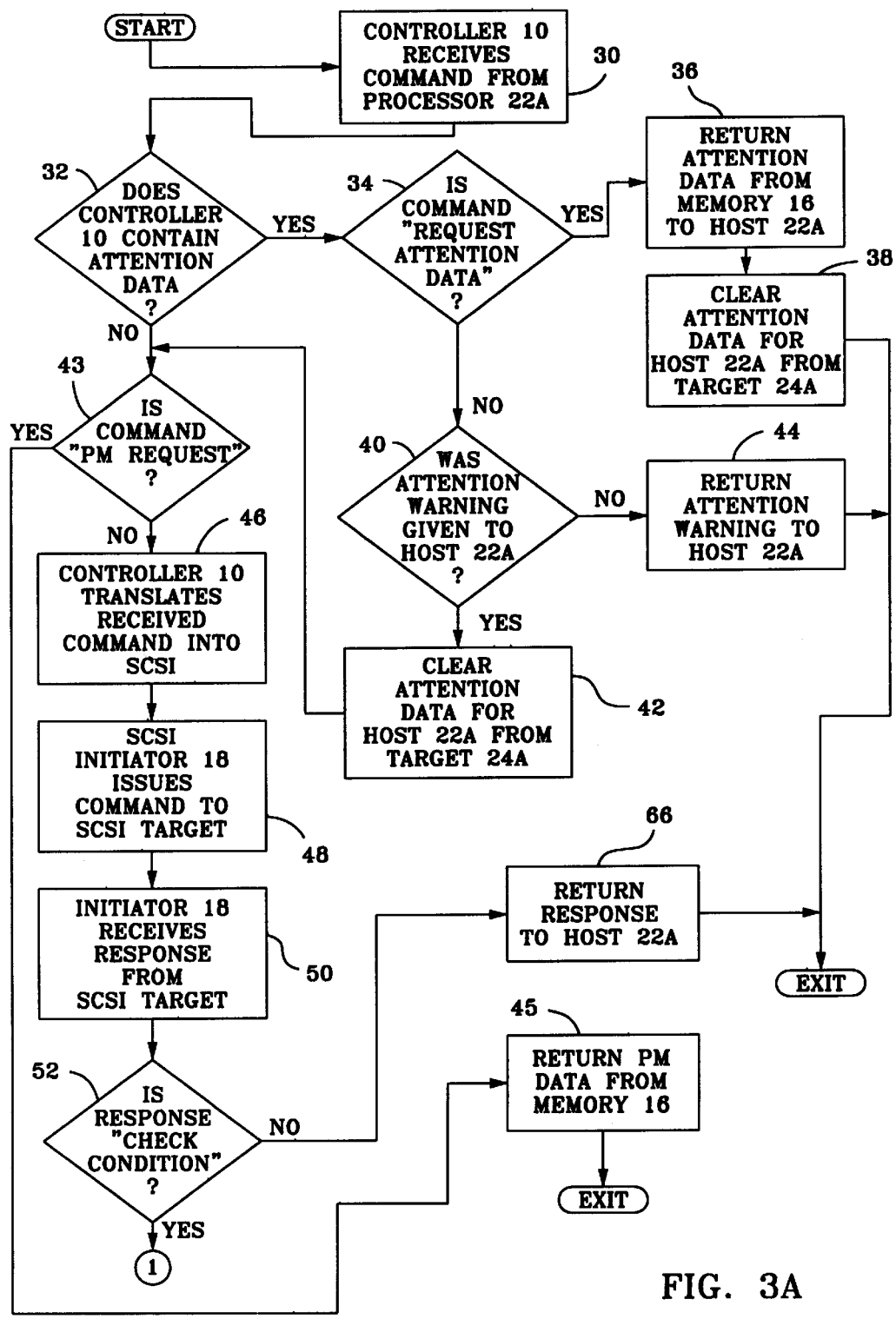
FIGS. 3A and 3B together comprise a flow chart depicting the operation of the controller of FIG. 1 when one of the host processors issues a command to the controller.
Figure 3B:
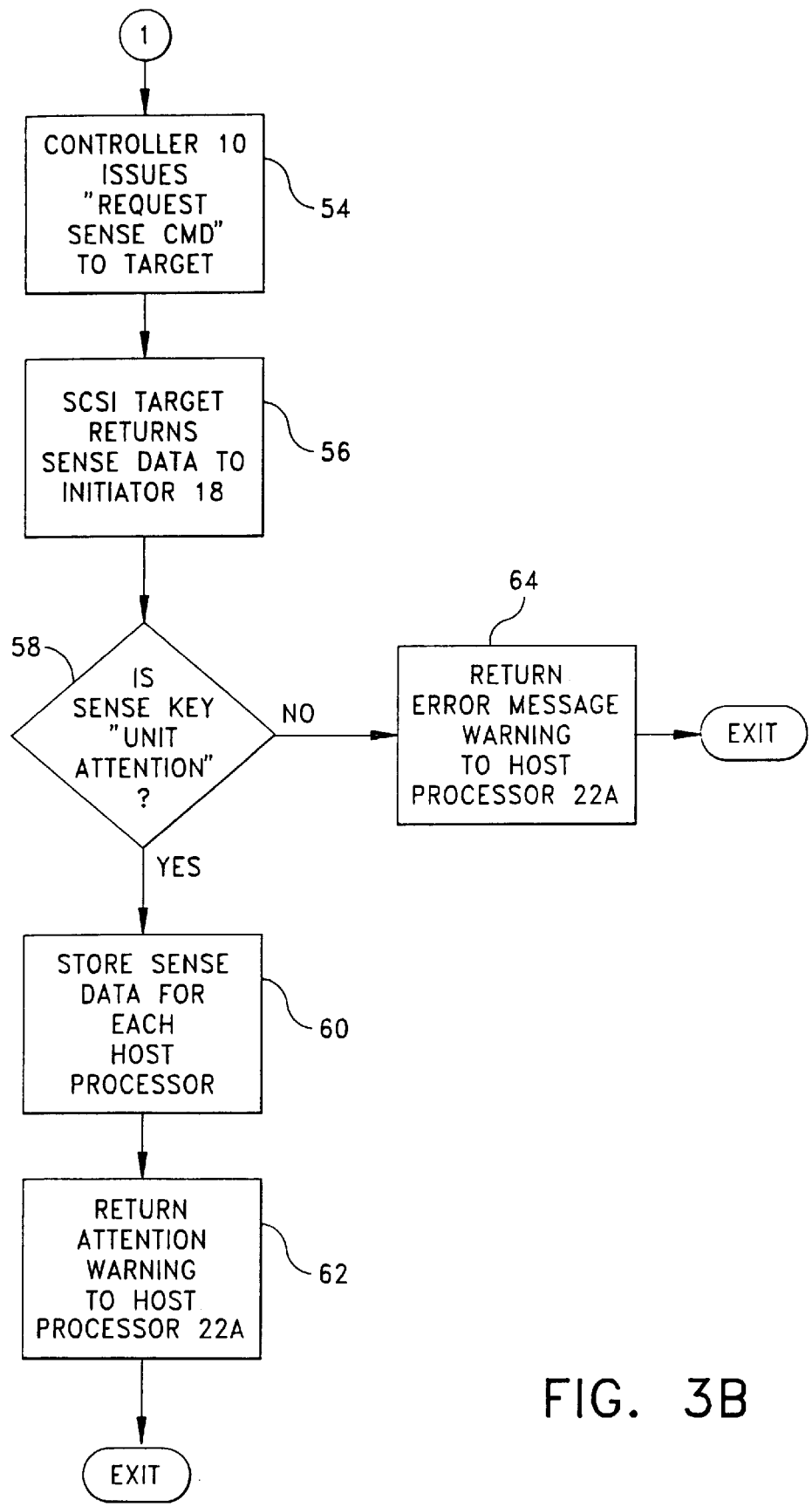
Figure 4:
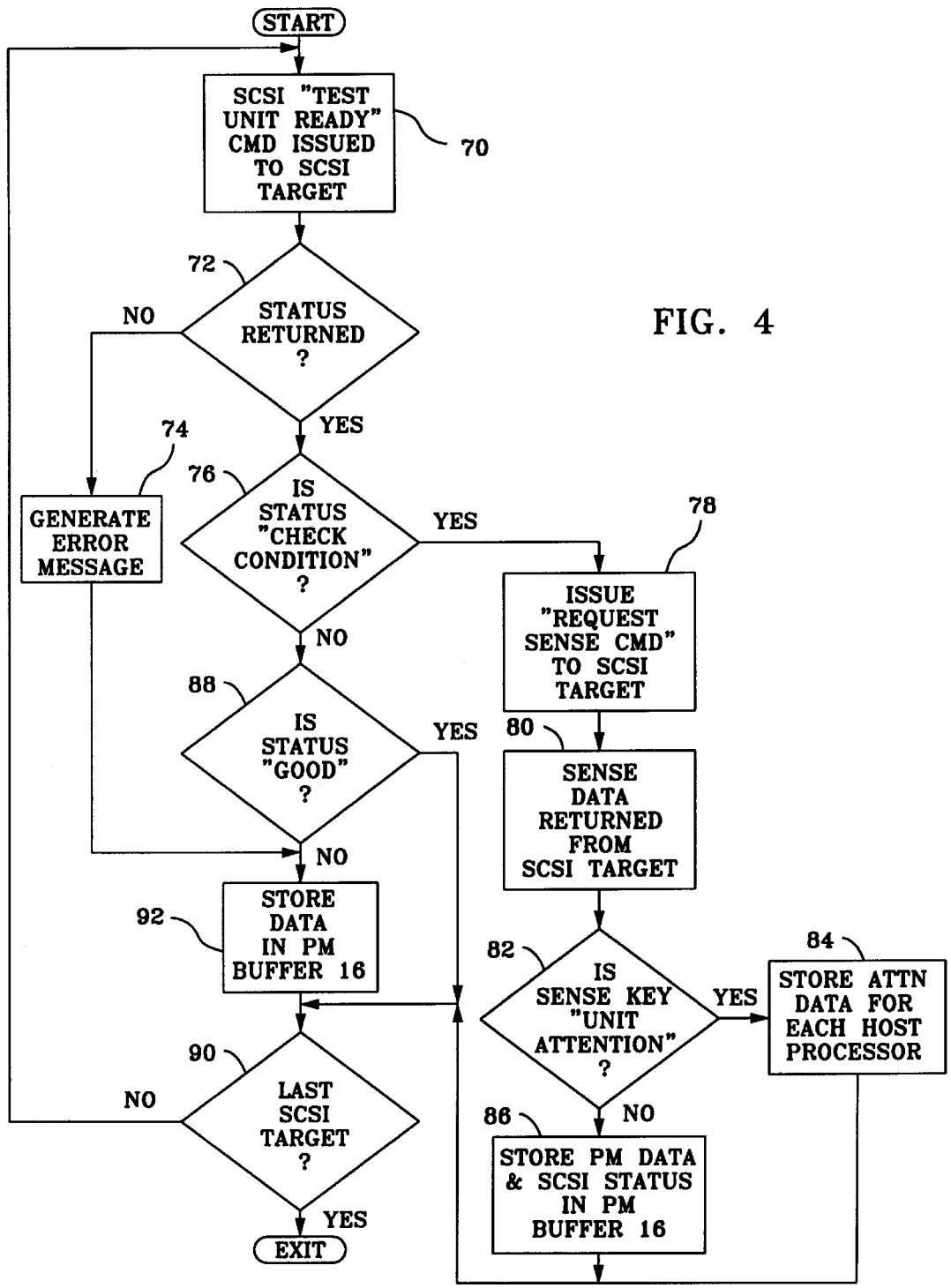
FIG. 4 depicts a flow chart of the performance monitoring (PM) routine that the controller of FIG. 1 executes.

Memory 16, as best shown in FIG. 2, represents a combination of static and dynamic Random Access Memory (RAM) and Read Only Memory (ROM) widely available to the public. The flow charts shown in FIGS. 3A, 3B, and 4 are operational sequences that can be either down loaded externally from an SCSI target and executed from RAM or permanently stored in ROM and executed from ROM or RAM. In any case, memory 16 represents the function that stores the program 27 and microprocessor 14 (FIG. 1) represents the function that executes the program 27.

FIG. 2 also shows that for each host processor 22a–n of FIG. 1 there is the storage of ATTENTION DATA for each target 24a–g of FIG. 1. The addresses for each host processor are shown as 28a–n. The information for each address is identical and is shown as 29. Memory 16 also shows target PM DATA 31a–g for each target 24a–g.

Refer again to FIG. 1. The normal operation of the various components within controller 10 is well documented by the prior art. Personal computers, workstations, and embedded controllers are widely used by the public and the various operational sequences that control their internal components are executed by commercially available software packages. The specific embodiment herein describes how a personal computer, workstation, or embedded controller can be adapted to function as an interface to a plurality of host processors logically connected to one SCSI initiator with up to seven SCSI target devices. The flow chart shown in FIGS. 3A and 3B is an operational sequence that controller 10 executes when any of the host processors 22a–n issues a command through controller 10 to any of the SCSI targets 24a–g. The flow chart shown in FIG. 4 is the operational sequence when the controller non-intrusively executes an internal PM routine that detects a CHECK CONDITION status.

The CHECK CONDITION status can be detected by the internal PM routine or by an initiated command of one of the host processors 22a–n. Both operational sequences shown in FIGS. 3A and 3B, and FIG. 4 are software tasks that are interrupt driven due to a specific event. The PM routine shown in FIG. 4 is a task that is executed periodically whenever an internal software timer generates an interrupt and schedules this task to be loaded into microprocessor 14. This task has a lower priority than the task shown in FIGS. 3A and 3B. When a host processor issues a command to controller 10, however, microprocessor 14 responds to this command by storing all reference data on its stack and executing the software task shown in FIGS. 3A and 3B. This task must have a higher priority than the PM task since controller 10 must always be available to respond to a command by an external host processor.

Before the flow charts in FIGS. 3A, 3B, and 4 are described, a brief description of an SCSI UNIT ATTENTION condition is given. SCSI is an intelligent protocol whereby bus sequences and target/initiator conditions are monitored. There are a number of conditions designated as UNIT ATTENTION. It will be described using target 24a although it is to be understood it is the same for all targets 24a–g. These UNIT ATTENTION conditions exist when the controller 10 of an SCSI target 24a is reset, power to a target 24a is cycled from OFF to ON or from ON to OFF to ON, or media has been removed and replaced within the internal controller of target 24a. The last situation is typical of optical disks that can be removed from a disk controller without having to cycle power OFF and ON. Whenever one of these conditions occurs, if the SCSI initiator 18 sends a command to the SCSI target 24a, the internal controller of the target 24a responds with a CHECK CONDITION status. This status informs the requesting initiator 18 that a condition exists with the target 24a that may be of interest to the initiator 18. The initiator 18, at this point, can ignore the CHECK CONDITION status and reissue the command. Since the situation is a UNIT ATTENTION condition, the CHECK CONDITION is cleared and the target 24a processes the reissued command in the normal fashion. If the initiator 18 does not want to ignore the CHECK CONDITION status, it can issue an SCSI REQUEST SENSE command to the target. The internal controller of the target 24a then responds with SENSE DATA. This SENSE DATA contains a key that indicates whether the CHECK CONDITION status originally returned to the initiator 18 was due to a UNIT ATTENTION condition or some other condition. The embodiment described herein is concerned with all check condition statuses.

Refer again to FIG. 1 for a description of the operational sequence that transpires when an SCSI target device is in a UNIT ATTENTION condition. Host processor 22a, interface 20a, host adapter 12a, and SCSI target 24a are referenced in the following sequence. However, the sequence is applicable to all processors 22a–n, interfaces 20a–n, host adapters 12a–n, and targets 24a–g shown in FIG. 1.

Host processor 22a issues a command over interface 20a to host adapter 12a. Microprocessor 14, sensing either by polling host adapter 12a or receiving an interrupt signal from host adapter 12a, reads that command from host adapter 12a. Microprocessor 14 verifies that host processor 22a sent a valid command and passes this command to SCSI initiator 18. SCSI initiator 18 selects the designated SCSI target 24a, using the selection protocol defined by the ANSI SCSI standard. Once the target 24a is selected, the command is passed to it.

SCSI target 24a, having received a command from SCSI initiator 18 is in a UNIT ATTENTION condition and responds to SCSI initiator 18 with a CHECK CONDITION status. This status is read and recognized by microprocessor 14. Microprocessor 14 then automatically issues an SCSI REQUEST SENSE command to SCSI initiator 18 that in turn issues the command to SCSI target 24a. SCSI target 24a contains an internal embedded SCSI controller characteristic of peripheral devices with an SCSI interface. The internal controller, disposed within SCSI target 24a, contains the SENSE DATA that describes the nature of the CHECK CONDITION status.

Initiator 18 then receives the SENSE DATA from SCSI target 24a. Microprocessor 14 reads this SENSE DATA and checks a unique bit field designated the sense key. This bit field consists of four bits. If the bit pattern is a six hexadecimal, it indicates that a UNIT ATTENTION condition has occurred. If the bit pattern is something other than six, then a fault or failure may exist within SCSI target 24a.

Controller 10, in addition to responding to commands from an external host processor, periodically executes a lower priority software task herein referred to as a PM or Performance Monitoring task. When controller 10 is not processing commands, it is executing this PM task that non-intrusively detects the status of all connected SCSI targets. If a CHECK CONDITION is returned from a SCSI target, then controller 10 issues the REQUEST SENSE command to the target to retrieve its SENSE DATA. FIGS. 3A and 3B together comprise the flow chart depicting the operation of controller 10 when a command is received from a host processor and FIG. 4 is the flow chart depicting the operation of the PM task. Both of these tasks are described later on.

Refer additionally to FIG. 2. Controller 10, having detected a UNIT ATTENTION condition at SCSI target 24a, stores this SENSE DATA for all host processors 22a–n connected to controller 10. Controller 10 maintains SENSE DATA of all SCSI targets 24a–g and for all host processors 22a–n. SENSE DATA received from SCSI targets 24a–g is stored in memory 16, in respective locations 28a–n, and is normally referred to as ATTENTION DATA in this disclosure. If the sense key indicates a fault or failure, then the SENSE DATA received from the SCSI targets 24a–g is stored in respective locations 31a–g in memory 16 and referred to as PM DATA in this disclosure.

Refer now additionally to FIGS. 3A and 3B. At task box 30 a command is received from host processor 22a for selected SCSI target 24a. The controller 10 at decision box 32 checks its memory 16 to see if ATTENTION DATA is present at the appropriate address. This ATTENTION DATA would be present at the above appropriate address in memory 16 if a previous command received from one or more of host processors 22a–n for SCSI target 24a resulted in a CHECK CONDITION status and the ATTENTION DATA had not been cleared. If memory 16 within controller 10, at the appropriate address, does contain ATTENTION DATA, controller 10 determines if the received command is a REQUEST ATTENTION DATA command at decision box 34. If it is, then at task box 36 controller 10 returns the ATTENTION DATA from memory 16 to host processor 22a using microprocessor 14. Once the ATTENTION DATA has been returned to the requesting host processor 22a, controller 10 clears the ATTENTION DATA at the appropriate address in memory 16 for the requesting host processor 22a at task box 38. No other addresses containing ATTENTION DATA within memory 16 are cleared by the action at task box 38.

If controller 10 does contain ATTENTION DATA at decision box 32, but the command received from host processor 22a is not REQUEST ATTENTION DATA at decision box 34, then controller 10 determines, at decision box 40, whether an ATTENTION WARNING was given to host processor 22a. The ATTENTION WARNING is a warning message sent from controller 10 to requesting host processor 22a indicating that controller 10 contains ATTENTION DATA in memory 16 at the address receiving ATTENTION DATA from SCSI target 24a for host processor 22a. If the warning was previously given and the command is not REQUEST ATTENTION DATA, then at task box 42 controller 10 clears the ATTENTION DATA at the address in memory 16 receiving ATTENTION DATA from SCSI target 24a for host processor 22a. If the ATTENTION WARNING was not provided to the requesting host processor 22a, then at task box 44 the warning is sent from controller 10 to the host processor 22a. At this point in the sequence, the host processor 22a can reissue the original command or send a REQUEST ATTENTION DATA command. If the reissued command is not REQUEST ATTENTION DATA, then all ATTENTION DATA stored in memory 16 is cleared at the address for that host processor 22a concerning the selected SCSI target 24a. The sequence is through boxes 30, 32, 34, 40, and 42. If the reissued command is REQUEST ATTENTION DATA, then the ATTENTION DATA is sent to the requesting host processor 22a and the ATTENTION DATA stored in the address at memory 16 for that host processor 22a and SCSI target 24a is cleared. The sequence is through boxes 30, 32, 34, 36, and 38.

When controller 10 receives a command from host processor at task box 30 and does not contain ATTENTION DATA at decision box 32, or the above sequence through boxes 30, 32, 34, 40, and 42 has taken place, controller 10 checks if the received command is a PM REQUEST at decision box 43. If it is, then any PM DATA stored at the appropriate address in memory 16 is returned to the requesting host processor 22a at task box 45.

If the received command is not a PM Request at decision box 43 controller 10 translates the received command into an SCSI command at task box 46 and sends it to SCSI initiator 18. SCSI initiator 18 interprets the SCSI command and selects the SCSI target 24a specified in the received command. SCSI initiator 18 then issues this command, at task box 48, to the selected SCSI target 24a and subsequently receives a response from the target 24a at task box 50. If at decision box 52 the response is a CHECK CONDITION, then controller 10 issues an SCSI REQUEST SENSE command to the selected SCSI target 24a at task box 54. The SENSE DATA is received by the initiator 18 from the SCSI target 24a at task box 56 and is read by controller 10 at decision box 58 to determine if the sense key is a six hexadecimal. If it is, then the received SENSE DATA is stored in memory 16 for every host processor 22a–n connected to controller 10 at task box 60 and an ATTENTION WARNING is sent to host processor 22a at task box 62 to complete the program. If the sense key is not a six hexadecimal, then an error message is sent to host processor 22a, at task box 64. This indicates that the SENSE DATA received from the SCSI target 24a in this case is not UNIT ATTENTION DATA but PM DATA. The PM DATA, along with the SCSI status from SCSI target 24a is stored in memory 16 at task box 68 to complete the program.

Decision box 52 can also render a response that is not a CHECK CONDITION. In such a case, the response is returned to host processor 22a at task box 66 to complete the program.

Refer now additionally to FIG. 4. Microprocessor 14 periodically executes the software task shown in FIG. 4 in order to detect a CHECK CONDITION status from any of the SCSI target devices 24a–g.

An SCSI command, TEST UNIT READY is issued from SCSI initiator 18 to SCSI target 24a at task box 70. This is a standard SCSI command that does not return data from SCSI target 24a. Only the SCSI STATUS WORD should be returned from the selected target 24a at decision box 72. If the STATUS WORD is not returned, then an error message is generated at task box 74 by microprocessor 14 and stored in memory 16 as PM DATA at task box 92. A reason for a STATUS WORD not returning from SCSI target 24a could be a fault or failure existing within the internal controller of the SCSI target 24a.

If a STATUS WORD is returned from the target 24a, then microprocessor 14 verifies if the status is CHECK CONDITION at decision box 76. If it is, then microprocessor 14, using SCSI initiator 18, issues a REQUEST SENSE command to the selected target 24a at task box 78. The SENSE DATA returned from target 24a, at task box 80, is read to determine if the SENSE KEY indicates a UNIT ATTENTION condition at decision box 82. If this condition exists, then the SENSE DATA received is stored in memory 16 as ATTENTION DATA at task box 84. If the SENSE KEY does not indicate a UNIT ATTENTION, then the data and status received are stored as PM DATA in memory 16 and made available for all host processors 22a–n, at task box 86. This PM DATA is replaced by new PM DATA on the next execution of the PM task.

If the STATUS WORD returned from the target 24a is not CHECK CONDITION then the STATUS is checked to determine if it is GOOD at task box 88. If it is, then the selected SCSI target 24a is assumed to be good and microprocessor 14 verifies if all SCSI targets 24a–g have been checked at decision box 90. If the STATUS WORD does not indicate GOOD, then this STATUS is stored as PM DATA in memory 16 at task box 92. Following the determination that the status is GOOD at decision box 88 or the storing of data at task box 84, 86, or 92 the decision box 90 determines if all SCSI targets 24a–g have been checked. The program then repeats the complete sequence of FIG. 4 for any targets that have not been checked.

Briefly, some of the features of the operation of FIG. 4 are that if a CHECK CONDITION status is returned from one of the SCSI targets 24a, the REQUEST SENSE command is issued to the target 24a. If the SENSE KEY indicates a UNIT ATTENTION, then the SENSE DATA returned is stored as ATTENTION DATA. If the SENSE KEY does not indicate UNIT ATTENTION, then the SENSE DATA retrieved is stored as PM DATA. If the STATUS WORD is not CHECK CONDITION but indicates a condition that is not GOOD, then the STATUS WORD is stored in memory 16 as PM DATA.

There has therefore been described a microprocessor 14 based controller 10 for use with SCSI peripherals 24a–g that periodically non-intrusively detects an SCSI CHECK CONDITION status from a selected SCSI target such as 24a and also processes commands and responses between host processors 22a–n and a selected target such as 24a. The controller 10, upon receiving the CHECK CONDITION status automatically issues a REQUEST SENSE command to the selected SCSI target 24a. The SENSE DATA received from the SCSI target 24a is checked to determine if a UNIT ATTENTION condition exists. If it does, then the received SENSE DATA is stored as ATTENTION DATA for all host processors 22a–n connected to the controller 10. If a UNIT ATTENTION does not exist but a fault or failure does, the controller stores the received data as PM DATA. The PM DATA is stored and made available to all host processors 22a–n. This PM DATA is replaced by new PM DATA in the next cycle. The REQUEST SENSE command, in accordance with the SCSI protocol, clears all SENSE DATA in the selected SCSI target 24a after that data is sent to the controller 10. This clearing of SENSE DATA, in prior art devices, meant that the SENSE DATA was only available for one of the host processors 22a–n. The invention described herein removes that limitation by storing the SENSE DATA for all host processors 22a–n in memory 16 whenever a UNIT ATTENTION condition exists. The invention also allows connected host processors 22a–n to be idle for long periods of time since the internal performance monitoring task detects and stores all changes in the condition of all SCSI targets 24a–g.

It will be understood that various changes in the details, materials, steps and arrangement of parts, which have been herein described and illustrated in order to explain the nature of the invention, may be made by those skilled in the art within the principle and scope of the invention as expressed in the appended claims.

What is claimed is:

1. A non-intrusive SCSI status sensing system comprising:

a controller having operating means for initiating and transmitting non-intrusive status requests and for receiving and storing ATTENTION DATA and PM DATA responses to said non-intrusive status requests; and a plurality of SCSI targets with each of said SCSI targets connected to said controller for receiving said non-intrusive status requests from said controller and having generating and transmitting means for generating and transmitting said ATTENTION DATA and PM DATA responses to said controller on receiving said non-intrusive status requests.

2. A non-intrusive SCSI status sensing system according to claim 1 wherein said controller further comprises an interconnection of at least one host adapter, only one SCSI initiator, a microprocessor, and a memory.

3. A non-intrusive SCSI status sensing system according to claim 2 wherein said controller further comprises:

said SCSI initiator connected to said each of said SCSI targets to transmit said non-intrusive data requests to said each of said SCSI targets and for receiving said ATTENTION DATA and PM DATA responses from said each of said SCSI targets; and said memory having storage means for storing said ATTENTION DATA and said PM DATA.

4. A non-intrusive SCSI status sensing system according to claim 3 wherein said controller further comprises:

first issuing means for issuing an SCSI Test Unit Ready command sequentially to each of said SCSI targets;

first determining means for determining for each sequentially issued command if a status response is received;

second determining means for determining for each sequentially issued command if the status is a CHECK CONDITION when the first determining means gives a positive response;

third determining means for determining for each sequentially issued command if the status is good when the second determining means gives a negative response;

first storing means for storing response data received for each sequentially issued command, as PM DATA, in a PM buffer when third determining means gives a negative response; and a sequencing means for sequencing to the next SCSI target and returning to the first issuing means when third determining means gives a positive response.

5. A non-intrusive SCSI status sensing system according to claim 4 wherein said controller further comprises:

generating means for generating an error message when it is determined by said first determining means that there is no status response; and second storing means for storing an error message, as PM DATA, in said PM buffer when it is determined by said first determining means that there is no status response.

6. A non-intrusive SCSI status sensing system according to claim 5 wherein said controller further comprises:

second issuing means for issuing a REQUEST SENSE command to each of said SCSI targets that has a CHECK CONDITION status;

returning means for returning SENSE DATA from each of said SCSI targets that was issued said REQUEST SENSE command;

fourth determining means for determining if a sense key is a UNIT ATTENTION on said SENSE DATA returned by said returning means;

third storing means for storing SENSE DATA returned from each of said SCSI targets that was issued a REQUEST SENSE command as ATTENTION DATA where the sense key is a UNIT ATTENTION; and fourth storing means for storing data returned from each of said SCSI targets that was issued a REQUEST SENSE command as PM DATA in PM buffers when the sense key is not a UNIT ATTENTION.

7. A non-intrusive SCSI status sensing system according to claim 6 wherein said controller further comprises being in the form of a personal computer.

* * * * *